3,516,873
SPRING-LOADED THERMOCOUPLE

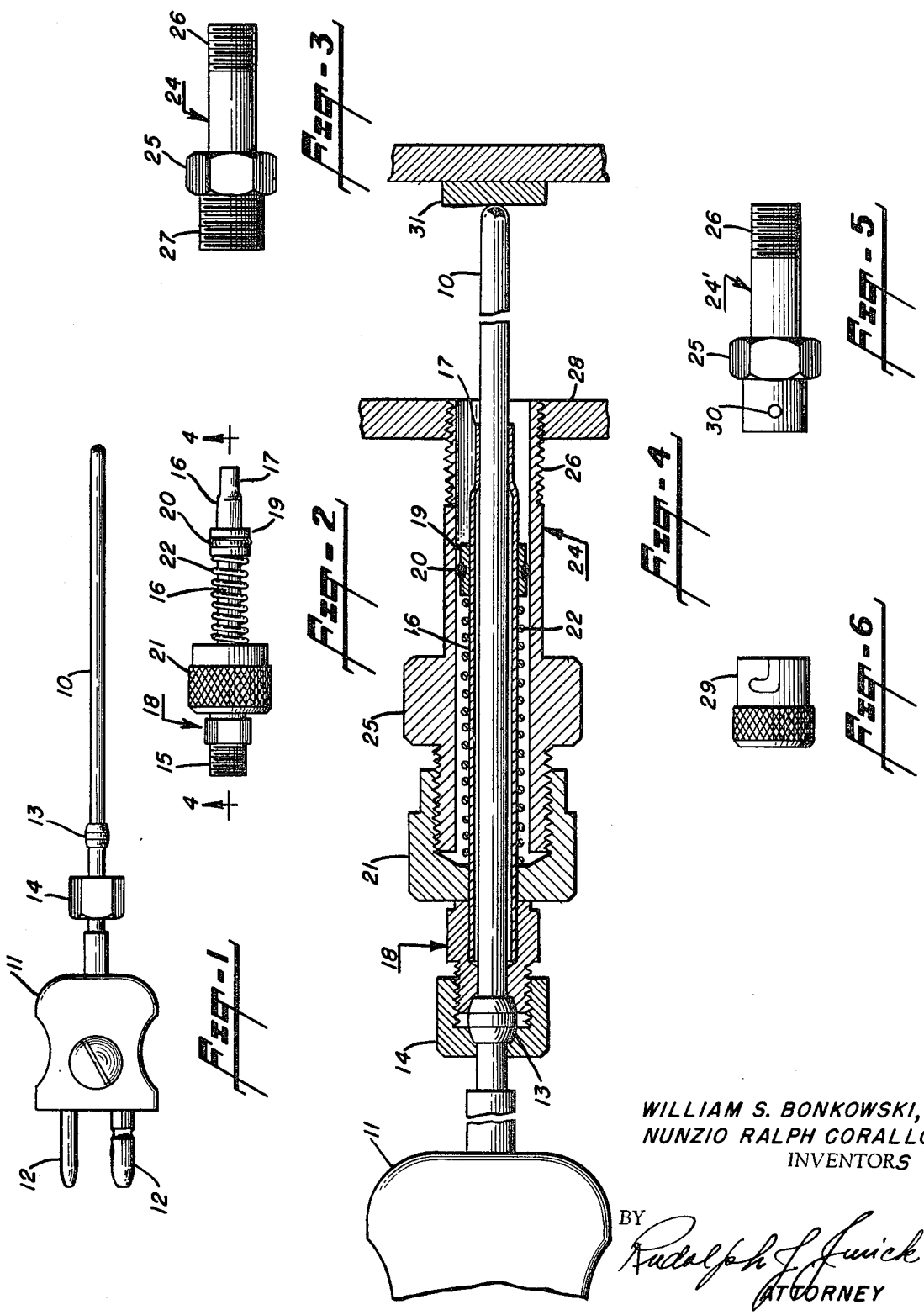

William S. Bonkowski, Clifton, and Nunzio Ralph Corallo, East Paterson, N.J., assignors to Thermo Electric Co., Inc., Saddle Brook, N.J., a corporation of New Jersey
Filed Apr. 13, 1967, Ser. No. 630,715
Int. Cl. H01v 1/02, 1/04, 1/06
U.S. Cl. 136—221                                                                                              4 Claims

ABSTRACT OF THE DISCLOSURE

A thermocouple has a stem insertable into an adapter which is attachable to a tubular fitting for the measurement of the temperature of a fluid under pressure. Fluid-tight seals are provided between the stem and adapter and between the adapter and fitting.

BACKGROUND OF THE INVENTION

The invention relates to a spring-loaded thermocouple provided with oil seals to prevent the escape of fluid when the thermocouple is used for the measurement of the temperature of a fluid under pressure.

Spring-loaded thermocouples of various constructions are known in the art, such devices including a spring-biased cap for securing the thermocouple to a cooperating fitting, thereby to position the hot junction of the thermocouple within a chamber for the purpose of measuring and/or controlling the temperature in such chamber. Spring-loaded thermocouples heretofore available are not suited for use in applications wherein the medium being measured is a fluid under pressure, as they do not include oil seals between components which are detachably connected together.

A spring-loaded thermocouple made in accordance with this invention comprises an adapter which serves to secure the stem of the thermocouple to a tubular fitting, thereby to position the hot junction of the thermocouple at a desired point in a fluid under pressure. Oil seals are provided to prevent the escape of the fluid between the stem, adapter, and fitting when these parts are connected together in operative relationship.

SUMMARY OF THE INVENTION

A spring-loaded adapter is attachable to a tubular fitting which is threaded into a hole formed in a wall of a chamber carrying a fluid under pressure, said adapter being provided with means cooperating with the inner wall of the fitting to form an oil seal. The stem of the thermocouple is insertable through the adapter, said stem and adapter being provided with cooperating means for securing these parts together and for forming an oil seal therebetween.

An object of this invention is the provision of a spring-loaded thermocouple for use in measuring the temperature of a fluid under pressure.

An object of this invention is the provision of a thermocouple assembly comprising a tubular fitting adapted for threaded connection to a wall of a chamber, an adapter attachable to the fitting and having a tubular member extending through the fitting, means forming an oil seal between the said member and the fitting, a thermocouple having a stem insertable through the said tubular member, and cooperating means carried by the said stem and adapter to form a fluid-tight connection between these members.

The above-stated and other objects and advantages of the invention will become apparent from the following description when taken with the accompanying drawings. It will be understood, however, that the drawings are for purposes of illustration and are not to be construed as defiining the scope or limts of the invention, reference being had for the later purpose to the claims appended hereto.

BRIEF DESCRIPTION OF THE DRAWINGS

In the drawings wherein like reference characters denote like parts in the several views:

FIG. 1 is a side elevational view of a thermocouple provided with means for coupling the stem to spring-loaded adapter in accordance with this invention;

FIG. 2 is a corresponding view of the adapter;

FIG. 3 is a corresponding view of a tubular connector fitting to which the adapter is attachable;

FIG. 4 is an enlarged, cross-sectional view as taken along the line 4—4 of FIG. 2 but showing the assembly of the thermocouple, adapted and fitting;

FIG. 5 corresponds to FIG. 3 and shows a modification of the fitting; and

FIG. 6 shows a slotted adapter cap for use with the fitting shown in FIG. 5.

Reference now is made to FIG. 1 showing a thermocouple having a stem 10 extending from a connector plug 11. Those skilled in this art will understand that the contact pins 12 are connected to two thermocouple wires disposed in the stem 10 and having ends connected together at the free end of the stem to form a thermocouple junction, and that the thermocouple is connectable to an electrical circuit by means of a complementary connector having sockets for receiving the pins 12. In accordance with this invention, a ferrule 13, made of metal or a suitable plastic, and an interally-threaded nut 14 are carried by the stem, said nut being rotatable about the stem. The ferrule has opposed conical surfaces and is compressed around the stem when the stem is secured to the adapter, as will be described hereinbelow.

The adapter is shown in FIG. 2 and comprises a tubular member 16 having a reduced-diameter end portion 17. The other end of the tubular member is silver soldered to a nut 18 having an externally-threaded shank portion 15. As shown in FIG. 4, the nut 18 has an axial hole extending therethrough, which hole terminates in an enlarged-diameter bore receiving the end of the tubular member 16. A metal collar 19 is silver soldered to the tubular member 16 and carries an O-ring 20 made of a suitable resilient material such as, for example, neoprene, a major portion of the O-ring being disposed within a peripheral groove formed in the collar. An internally-threaded cap 20, slidably carried by the tubular member 16, normally is biased into engagement with the nut 18 by means of a coiled spring 22, which spring is compressed between the collar 19 and the base of the cap.

The tubular fitting to which adapter is removably attachable is shown in FIG. 3 and identified by the numeral 24. Such fitting includes a hexagonal portion 25 to facilitate the threaded coupling of the end 26 tightly into a threaded hole formed in a wall of a chamber containing a fluid under pressure. The other end 27, of the fitting, is threaded for receiving the coupling cap 21 of the adapter.

The assembly of the thermocouple, adapter and fitting is shown in the enlarged cross-sectional view of FIG. 4, which view also shows the fitting 24 threaded into a hole provided in the wall 28 of a chamber containing a fluid under pressure. The tubular member 16, of the adapter, is inserted into the fitting and the cap 21 is screwed onto the fitting as shown. The dimensions of the collar 19 and the fitting are such that the O-ring 20 is compressed between the collar and the inner wall of the fitting, thereby forming a seal to prevent the passage of the fluid beyond this point. The thermocouple stem 10 is inserted through the axial hole of the nut 18 and through the tubular member 16 of the adapter until the end of the stem projects a desired distance beyond the tubular member 16. Formed in the end surface of the nut 18 and in the base of the nut 14 are conical seats corresponding to the conical surfaces of the ferrule. Thus, when the nut 14 is tightly threaded onto the shank of the nut 18, the cooperating conical surfaces of the ferrule and the two nuts results in the compression of the ferrule about the stem 10, thereby forming a fluid-tight seal. The stem fits snugly within the reduced-diameter end 17, of the tubular member 16, thereby forming a bearing surface maintaining an axial alignment of the stem within the tubular member. The compressed spring 22 provides an axial force between the cap 21 and the collar 19 which force maintains the end of the stem in continuous contact with a surface the temperature of which is being measured as, for example, the block 31 secured to the opposite wall of the chamber and made of a material having a good heat conductivity. Axial movement of the stem will result upon thermal expansion of the block 31. The described construction maintains contact between the stem and the block throughout the range of movement of the stem without affecting the oil seal between the fitting 24 and the collar 19.

The adapter can be attached to the tubular fitting by means of a bayonet coupling instead of by means of a threaded cap 21, as described. In such case the cap 29, shown in FIG. 6, is provided with a slot for receiving a radial pin 30 extending from the non-threaded end of the fitting 24' as shown in FIG. 5.

From the above description it will be apparent that spring-loaded thermocouple made in accordance with this invention comprises an adapter to which the thermocouple stem is detachably secured by means forming a fluid-tight seal. The adapter, in turn, is removably attachable to a tubular fitting to position the thermocouple in operative position within a chamber carrying a fluid under pressure, said adapter carrying means which cooperates with the inner wall of the fitting to form a fluid-tight seal.

Having now described the invention, those skilled in this art will be able to make various changes and modifications without thereby departing from the spirit and scope of the invention as recited in the following claims.

We claim:
1. A thermocouple assembly comprising a tubular fitting having a coupling means at an end thereof,
a tubular member insertable into the fitting,
a first nut secured to one end of the tubular member and having an axial hole communicating with the interior of the tubular member, said nut having an externally-threaded shank portion and a conical end surface forming a seat,
a cylindrical collar secured to the tubular member and spaced from the said nut,
a resilient member carried by the collar and cooperating with the inner wall of said fitting to form a fluid-tight seal,
a cap disposed between the collar and said nut, said cap being rotatable about the tubular member for mechanical coupling to the coupling means of the fitting,
a coiled spring compressed between the said cap and collar,
a thermocouple having a stem passing through the hole in said first nut and through the said tubular member, a second nut threaded onto the said shank portion and having a conical surface forming a seat, and
a ferrule encircling the said stem and having opposed conical surfaces in flush engagement with the seats of the said nuts.

2. The invention as recited in claim 1, wherein the said coupling means at an end of the fitting is an externally-threaded portion, and wherein said cap has a corresponding internal thread.

3. The invention as recited in claim 1, wherein the said coupling means at an end of the fitting is a radially-extending pin and wherein said cap is provided with a slot for bayonet coupling to the said pin.

4. The invention as recited in claim 1, wherein the other end of said tubular member is a reduced diameter portion having an inside diameter corresponding substantially to the outside diameter of the said stem.

References Cited

UNITED STATES PATENTS

| | | | |
|---|---|---|---|
| 935,154 | 9/1909 | Hopkins | 136—235 |
| 949,704 | 2/1910 | Hopkins | 136—230 X |
| 2,084,992 | 6/1937 | Claypoole | 136—230 |
| 2,194,489 | 3/1940 | Woodson | 136—221 |
| 2,311,886 | 2/1943 | Thomas | 136—232 X |
| 2,898,933 | 8/1959 | Bancroft | 136—228 X |
| 3,376,169 | 4/1968 | Davis et al. | 136—230 |

FOREIGN PATENTS

| | | |
|---|---|---|
| 596,931 | 4/1960 | Canada. |
| 814,503 | 6/1959 | Great Britain. |
| 852,782 | 11/1960 | Great Britain. |

OTHER REFERENCES

Machine Design, September 1944, pp. 121–124.

WINSTON A. DOUGLAS, Primary Examiner

A. M. BEKELMAN, Assistant Examiner

U.S. Cl. X.R.

136—230